July 19, 1949.  J. STUART, III., ET AL  2,476,638
CONTROLLABLE PITCH PROPELLER
Filed April 3, 1944  2 Sheets-Sheet 1

INVENTOR
JOSEPH STUART III
WARREN D. BERKLEY
ATTORNEY

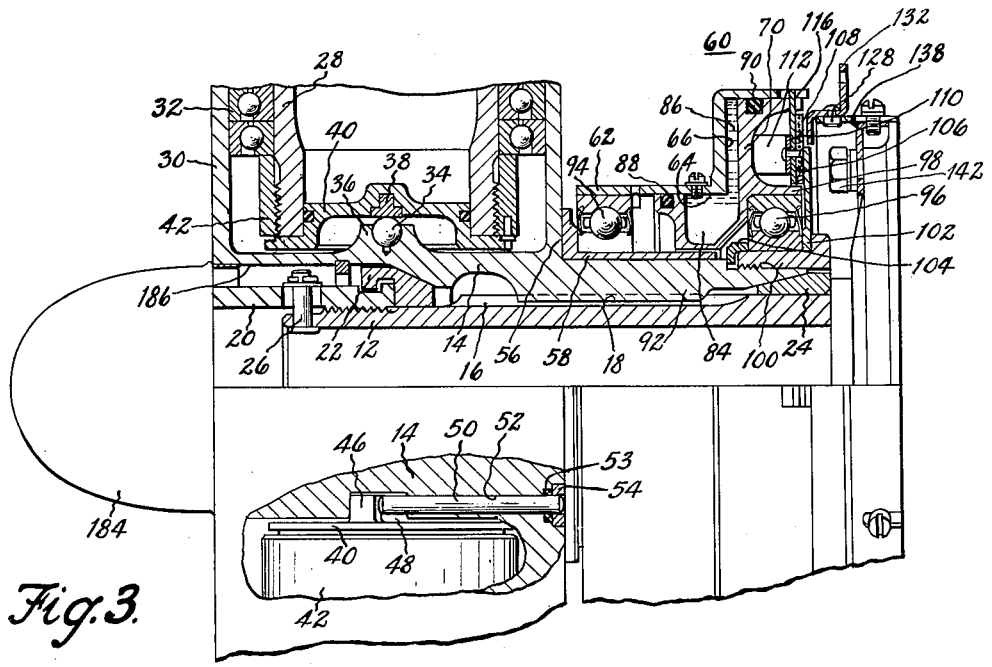

Patented July 19, 1949

2,476,638

UNITED STATES PATENT OFFICE 2,476,638

CONTROLLABLE PITCH PROPELLER

Joseph Stuart, III, and Warren D. Berkley, Dayton, Ohio, assignors to General Motors Corporation, Detroit, Mich., a corporation of Delaware Application April 3, 1944, Serial No. 529,261

10 Claims. (Cl. 170—160.18)

This invention relates to propellers for aircraft, and particularly to those of the high-low pitch position, or two position type of construction.

One object of the invention is to provide a propeller for aircraft with alterable pitch blades, which can be manufactured at low cost and be serviceable for inexpensive craft.

Another object of the invention is to provide a two-position propeller having a low pitch position, such as is usually used for take-off and climb operating conditions, and a high pitch position, such as is usually used for high speed flight and cruising.

Another object of the invention is to provide a controllable pitch propeller characterized by a simplified operating principle and mechanism adapting it to inexpensive mass production.

Another object is to provide a propeller control mechanism obtaining a positive readily controlled operating force from the action of centrifugal force, and in particular, from the centrifugal fluid pressure of a dense fluid medium such as mercury rotating in a simple expansible chamber.

Another object of the invention is to provide a controllable pitch propeller having no contacting relatively moving parts during cruising operation in the high pitch position.

Another object of the invention is to provide a controllable pitch propeller having only very lightly loaded moving parts in the low pitch position.

A further object is to provide a controllable pitch propeller requiring only noncritical engagement and/or disengagement of friction faces to effect its control.

A further object is to provide a propeller pitch control utilizing friction controlling means that have no relative motion except during the occasional brief intervals when the pitch is being changed which infers only zero and negligible power absorption in high and low pitch respectively.

A further object is to provide a controllable pitch propeller that is characterized by an axially symmetrical system that is by its very nature readily balanced.

A still further object of the invention is to provide a controllable pitch propeller capable of selective shift to either high or low pitch position while rotating, without requiring throttle adjustment of the engine, or other secondary manipulations.

Another object of the invention is to provide an alterable pitch propeller that can be shifted while the propeller is rotating to either a high pitch position, or to a low pitch position.

A further object of the invention is to provide an alterable pitch propeller that will effect pitch change in response to the action of a centrifugal fluid.

Another object of the invention is to provide an alterable pitch propeller with shiftable blades supported in the hub by a centripetal thrust bearing to assure ease of shift in response to small or weak shifting forces.

Other objects comprehended by the invention include utilizing the centrifugal force or twisting moment of the blades to return them to the low pitch position; providing a simple cockpit control giving a positive locked-in position, when necessary, and quick release, to avoid unnecessary wear of the friction engaging surfaces; fluid seals for centrifugal fluid pitch shifting units that suffer only small occasional relative movements and are thus free of wear and other high rotational speed difficulties; low pitch blade increasing pitch force load transfer to a stationary nut; chrome plated or other corrosion resistant surfaces for the expansion chamber; and a ball type preloading bearing located on the blade pitch changing axis.

Further objects and advantages of the present invention will be apparent from the following description, reference being had to the accompanying drawings wherein a preferred embodiment of the present invention is clearly shown.

In the drawings:

Fig. 3 is a view in part section showing the parts shifted for high-pitch blade setting as compared with the low-pitch setting shown in Fig. 1.

Fig. 4 is a fragmentary view in perspective, with parts broken away to show the contributing parts in loosely assembled relation.

Figure 2:
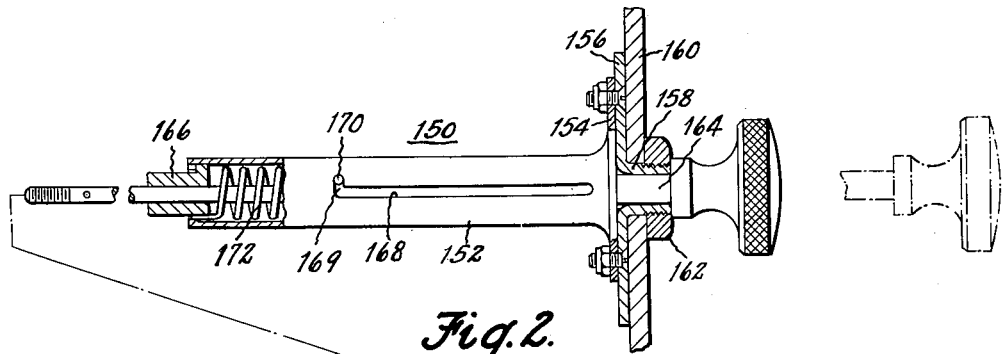
Fig. 2 is a view of the manual controller therefor with the connection indicated by a dashed line.

The present-day development of controllable pitch propellers for aircraft has chiefly followed the desire and needs of the commercial plane and the war plane, becoming too complicated structurally, too costly and too massive for use on the small craft, and particularly on privately owned craft. Attempts have been made to fashion controllable pitch propellers suitable for the small craft owner, but following the trends of development for the larger craft they become impracticable for the lesser powered machines. While some of these attempts overcome the use of hydraulic circuits and electrical devices, and make use of centrifugally operated devices and manually actuated linkage for effecting the shift of blade pitch, they nevertheless are so complicated and add so much load to the craft that their advantages are overshadowed by loss of maneuverability, flight speed, flight range, and excessive cost. Some of the simpler proposals incorporate relatively moving parts that are more or less subject to constant wear while the propeller is operating, or at least while operating under a particular set of conditions, such as during one of the pitch settings. In some instances, there is a slipping of friction faces throughout the operation in one or more pitch settings. With many of the devices of that character it is necessary to alter the engine speed before the contemplated blade pitch setting can be made. The present invention accomplishes the end sought by others, but overcomes their handicaps by providing a propeller pitch control operating on a simple principle of centrifugal force, and which adopts for the active elements a centrifugal mass that may be caused to rotate with the propeller, or may be arrested in its motion. Linkage from the mass to the blades is such that the stresses on the pitch change mechanism are at a minimum, and in some cases non-existent. The number of relatively movable parts are at a minimum, and wear between relatively movable parts is reduced to that brief interval of time during which the blades are being moved from one pitch position to another position, in fact only during the start of such shift. With the disclosed embodiments it is not necessary to alter the engine speed when a change in blade pitch setting is made.

According to the invention an airscrew is provided in which a low pitch setting and a high pitch setting are always available at the option of the pilot. The propeller blades are so characterized that they normally seek a low pitch position in response to centrifugal and aerodynamic forces applied to the blade during its rotation. The changes from low pitch to high pitch, and vice versa, are effected by the response of a rotating fluid medium or other mass to centrifugal force applied under the control of the pilot, which he may apply at any time. To shift to the high pitch position the pilot permits a mass such as a container charged with the fluid to rotate so that relative movement of a piston and cylinder is operative to rotate the blades to the high-pitch position. To shift to the low pitch position the pilot arrests rotation of the mass or the container for the fluid, and the built-in characteristics of the blades make them seek the low pitch position. When it is desired to change the pitch of the propeller all that is necessary is for the pilot to manipulate the control member in the cockpit. Moving it to one position effects a shift to the high pitch position and moving it to another position effects a shift to the low pitch position.

Referring particularly to the drawings, 10 indicates an engine nose or gear casing from which extends a rotatable engine driven propeller shaft 12 drivingly engaging a propeller hub 14 through the splines 16 and 18, where the parts are maintained by a shaft nut 20 operating through a split cone 22 to crowd the hub against a rear cone 24, while a lock device 26 insures that the nut and shaft will not loosen. The hub 14 sockets a plurality of propeller blades 28 by means of sockets 30 having stack bearings 32 to journal the blade and an inward thrust, or centripetal thrust bearing 34 secured in a boss 36 and adapted to continually engage a thrust plate 38 located on the axis of blade rotation. A cap 40 secured on the end of the blade root supports the thrust plate 38 while a blade nut 42 secured to the blade root transmits centrifugal forces to the bearing stack 32 which in turn abuts against a blade retaining nut 44 by which the bearing mount of the blade may be preloaded. The blade cap 40 also provides a lug 46 extending generally toward the axis of propeller rotation into a slot 48 of definite length, so that the blade in rotating within its socket is limited by the extent of movement of the lug 46 along the length of the slot 48. The blades 28 are so proportioned and characterized that while rotating they would normally seek the low pitch position, such that the lug 46 would be at the right hand end of the slot 48 substantially as shown in Fig. 1 of the drawings in the case of a right hand propeller.

In that position of the blades the lug 46 has pushed aft a pin 50 carried in a bore 52 of the hub, that is arranged substantially parallel with the axis of rotation, and which pin extends out the aft face of the hub where it passes through a seal and retainers 53 and 54 respectively. The pins 50 are slidable along the bore 52 and are of such length that they are always engageable with a flange 56 of an axially movable shifting sleeve 58 coupled to the active element of a pitch shifting unit 60 carried by the hub.

Figure 1:
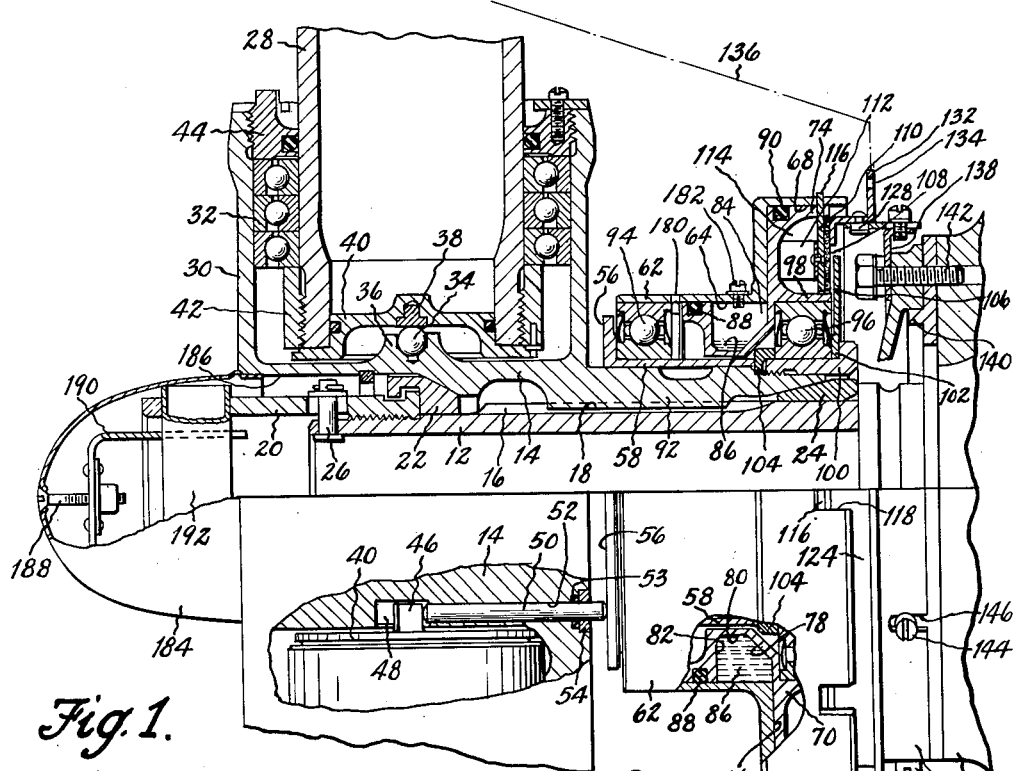
Fig. 1 is a view partly in longitudinal section and partly in elevation of a propeller incorporating the instant invention.

The pitch shifting unit is shown in partially separated and broken perspective in Fig. 4 and in assembled relation in Figs. 1 and 3, where the parts occupy the low pitch and high pitch positions respectively. The unit per se comprises a stepped cylinder 62 having a relatively small cylindrical surface 64 joined by an annular plane surface 66 to a relatively large cylindrical surface 68, and is fitted with a stepped piston 70 having a relatively small cylinder 72 fitting the surface 64 and a relatively large cylinder 74 fitting the surface 68, the two pistons being joined by a plane surface 76 mating with and disposed opposite to the plane surface 66. The plane surface 76 is annular and is carried radially inward to join the walls 78, 80 and 82 forming an annular groove 84 provided by the piston member. The groove 84 forms an annular reservoir between the piston and cylinder, which provides a definite minimum volume to be charged with a quantity of fluid medium 86 of relatively high density. Mercury is the preferred material for such charge, but it is comprehended that other mediums are suitable for the same uses. In any instance the portions of the piston and cylinder coming in contact with the mercury or other selected fluid should be treated to prevent corrosion, amalgamation or other deteriorating effects, and the joints between assembled parts subjected to the medium should be treated or fashioned to avoid leakage or other loss of the medium. In the present instance appropriate seal rings 88 and 90 are set in the piston portions 72 and 74 respectively.

The shifting unit so constituted is mounted on a rearward tubular or sleeved extension 92 of the hub 14 by means of journal ball bearings 94 and 96 so that the unit may either rotate with the hub or stand at rest relative to the engine nosing while the hub rotates within it. The bearing 94 is disposed with its races between the shifting sleeve 58 and the small cylinder 62 while the bearing 96 is disposed between a concentric flange 98 of the piston and a nut 100 threaded on the hub extension 92 the nut securing the assembly in place. The nut 100 also engages and clamps an annular plate 102 against turning relative to the hub and engages a thrust ring 104 by which the bearing 96 is retained against axial movement along the hub extension. The bearing 94 is fixed against movement axially of the shifting sleeve 58 and cylinder 62, but since the sleeve 58 is capable of movement axially of the shaft or hub extension 92, then the cylinder 62 and bearing 94 as a unit is capable of movement axially of the hub.

Axial movement of the cylinder is opposed only by the natural tendencies of the blades to seek the low pitch position, and the shift in either direction is accomplished by controlling the rotation of the mass of fluid in the chamber 84. Selective control or shifting of unit rotation is effected by a plurality of friction faces, one of which is a clutch face 106 carried by the annular plate 102 and consequently always rotatable with the hub 14. A friction face 108 of annular form is carried by a plate 110 loosely assembled with the stepped piston 70 and continually urged by suitable spring means 112 toward engagement with the clutch face 106. The plate 110 is arranged concentric with the flange 98 and bridges an annular channel 114 between the flange 98 and the outer diameter cylinder 74, the channel 114 operating to house the spring means 112. The plate 110 also provides a plurality of outwardly extending lugs or tongues 116 movably engaging in notches 118 and 120 in the rim of the cylinder 62 and the piston 74 respectively to permit relative axial but not relative rotational motion therebetween. A brake face 122 provided by an axially displaceable ring 124 is capable of manipulation to engage and disengage the friction face 108, and in so doing controls the rotation of the shifting unit.

The ring 124 is supported by a fixed ring 126 through the agency of fixed pins 128 in the ring 124 that project into cam slots 130 of the ring 126. A flange portion 132 is apertured at 134 to receive one end of a control wire or rod 136 extending from the pilot's compartment. The supporting ring 126 is rigidly fixed to a flanged plate 138 that is held rigid from the engine nose 10, and concentrically disposed about the shaft 12 and about a piloting ring 140, by screw devices 142. Rigid and adjustable coupling of the ring 126 and the flanged plate 138 is accomplished by a plurality of screw devices 144 passing through notches or slots 146 of the ring 126 and threading into the flange of the plate 138, which when tightened hold the parts in such relation that the brake face may be engaged with and disengaged from the friction face by suitable oscillation of the ring 124.

To effect oscillation of the ring 124, the rod or wire 136 is carried to a manual 150 located in the cockpit where it is accessible at all times to the pilot. One form of such manual is shown in Fig. 2, where its operative connection to the shifting unit is shown by the dashed line represented at 136. A tubular housing 152 has a flange 154 by which it is secured to a head member 156 extruded at 158 to form a guide sleeve extending through a dash member or bulkhead 160 to be fitted with a retaining nut 162. Slidable through the sleeve 158 is a knobbed rod 164 that is guided at the other end of the housing by a stepped sleeve 166 beyond which the rod is connected with the wire 136. The wall of the housing 152 is provided with a long slot 168 ending in an angular offset 169 and is adapted to guide the movement of a pin 170 set in the rod 164, while a spring 172 disposed within the housing and compressible between a part of the rod 164 and the sleeve 166 normally urges the retraction of the rod from the offset end of the slot 168. Considering the illustrated embodiment, it will be observed that manual depression of the rod 164 causes the spring 172 to be compressed as the pin 170 slides to the left along the slot 168. The spring 168 is so constituted and stressed in its assembly that when the pin 170 reaches the offset portion 169, that rotation of the rod is effected to dispose the pin in the notch provided by the offset, whereby the rod 164 is held in the depressed position. A slight reverse turn of the rod is all that is necessary to accomplish shift of the manual to the other extreme position, since then the spring 172 is released and projects the rod to the extended position shown in dotted lines. In the illustrated embodiment the extended position of the rod pulls upon the wire or cable 136 to oscillate the ring 124 so that the brake face 122 is disengaged from contact with the friction face 108 allowing the friction face to engage the clutch face 106. On the other hand depression of the rod 164 engages the brake face with the friction face 108 and withdraws the friction face from the clutch face 106 substantially as shown in Fig. 1.

Thus, manipulation of the manual 150 provides for either arrestment or rotation of the pitch shifting unit. When the shifting unit is arrested, that is, when it is restrained from rotating with the hub, the centrifugal responsive fluid 86 within the annular chamber 84 remains quiet and finds its own level in the chamber, substantially as illustrated in Fig. 1. The blades 28 being free from any biasing influence except the centrifugal force and aerodynamic forces due to hub rotation, seek the low pitch position. When the shifting unit is permitted to rotate with the hub, the chamber 84 and its fluid content 86 is also rotated and the fluid is thrown against the cylindrical wall 64 from where it presses between the parallel faces 66 and 76 of the cylinder and piston. This last pressure causes the cylinder to move axially of the shaft relative to the piston. As it does so the cylinder carries with it the bearing 94 and the shifting sleeve 58 causing the flange 56 to press the pins 50 forward of the shaft to rotate the blades to the high pitch position as defined by the lug 46 abutting the end of the slot 48 as shown in Fig. 3. Pressure relief for the relative movement of the piston and cylinder is afforded by an opening 180 through the cylinder 62, and access to the chamber 84 for charging it with the desired amount of centrifugal fluid is afforded by a screw plug 182.

Figure 5:
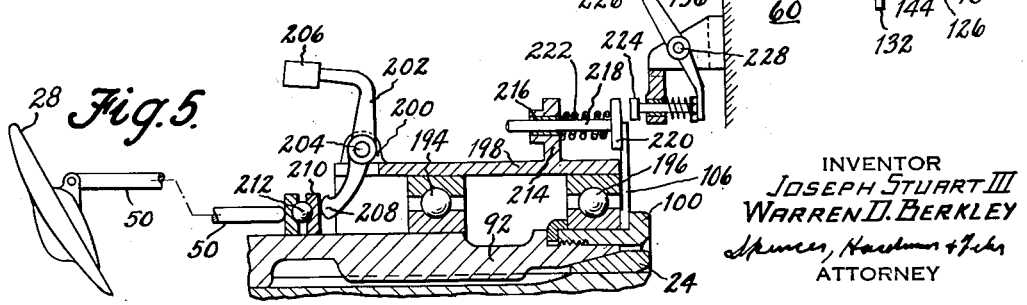
Fig. 5 is a fragmentary view, in section, illustrating a modified form of controllable pitch mechanical shifting means.

An alternative form of the shifting unit is shown in Fig. 5, where the bearings 194 and 196 mounted on the hub extension 92 forms a journal bearing for the sleeve, here indicated at 198. The sleeve provides a plurality of spaced lugs 200 to which are pivoted bell cranks 202 at 204, and having weighted masses 206 at their free ends, while the pivoted ends provide arms with cams 208 engageable with the proximate race member 210 of a ball bearing 212 arranged to press upon the ends of the pins 50. The sleeve 198 also provides lugs or a flange 214 apertured at 216 to guide the ends of pins 218 supporting a friction face 220, while springs 222 surrounding the pins 218 and disposed between the flange 214 and friction face member 220 urge the friction face 220 toward engagement with the clutch face 106 which has heretofore been described as carried by and driven by the hub extension 92. Similarly, a brake face 224 is operable by a lever 226 pivoted at 228 and actuated by the cable 136 to selectively engage the friction face 220 for arresting rotation of the shifting unit. From a glance at Fig. 5 it should be apparent that when the friction face engages the clutch face, then the shifting unit rotates with the hub and the centrifugal force of rotation causes the weights 206 to move out radially and in doing so push the pin 50 to the left for moving the blades 28 to the high pitch position. Likewise, engaging the brake face 224 with the friction face 220 first disengages the friction face from the clutch face and then arrests rotation of the shifting unit, with a consequent inward movement of the weights 206. The blades are now free to respond to their natural tendencies in seeking the low pitch position.

In the illustrated embodiment of Fig. 1, the propeller is mounted on a hollow shaft 12, and the end of the shaft is closed off by a spinner 184 which engages within the shaft bore 186 of the hub 14. The spinner is held in place by a long screw device 188 threading into a yoke 190 whose arms are apertured to receive a tubular cross pin or bar 192 lodged in the wrench receiving apertures of the hub retaining nut 20. However, the provisions of cannon fire through the shaft may be retained by removal of the spinner, or by fitting with a spinner having an axial opening registering with the bore of the shaft 12. On the other hand, either type of spinner may be fashioned so as to enclose the hub and the root portion of the blades, as well as the shaft end only.

From the illustrated and described embodiment of the invention it should be apparent that applicants have provided a two position propeller pitch control that can be built inexpensively and serve the purpose of having a low pitch setting for take off and climb, with an instant and positive control of shift to high pitch position for cruising, or other maneuvers. The shift to high pitch or to low pitch can be made at any instant that the pilot desires, and there is no need or requirement for manipulation of the engine throttle when any shift in blade pitch is made. The principle of operation is simple, and the mechanism effecting the shift is not subject to inadvertent disorganization or injury. The relatively moving parts are few and are so moved only at the time of shift from one pitch setting to another. Adaption of centrifugal force renders the shift always positive and readily controlled; coupling of the force to the shifting means effecting a change to the high pitch position, while uncoupling the force insures a shift to the low pitch position. When the pitch setting is in the high pitch position there are no contacting relatively moving parts, and when in the low pitch position there are but lightly loaded relatively moving parts, such as the journal bearings 94, 96 and/or 194, 196, where the load is confined to the thrust of the blades, in the low pitch position, upon the ends of the pins 50. In the form of Fig. 1, even that is minimized by the fact that the end of the sleeve 58 engages the ring 104 and relieves the thrust upon the bearings 94 and 96. Engagement and disengagement of the various friction faces is non-critical since the parts are in slipping engagement but a very short time during the commencement of the shift. The friction faces have no relative slipping engagement in either pitch position. The shifting unit being axially symmetrical it, by its very nature, establishes its own balance during the assembly operation.

While the embodiment of the present invention as herein disclosed, constitutes a preferred form, it is to be understood that other forms might be adapted, all coming within the scope of the claims which follow.

What is claimed is as follows:

1. In a high-low pitch propeller, an engine driven hub having a sleeved extension, blades socketed in the hub for pitch shifting movement and normally seeking a low pitch position, a pitch shifting unit carried by said hub extension and adapted to shift the blades to the high pitch position, said unit comprising a piston and a cylinder both rotatable relative to the hub extension, and one thereof being axially movable with respect to the hub, a centrifugally responsive fluid contained in the chamber of the cylinder, and means remote from the propeller for arresting the rotation of the unit at the option of the pilot.

2. In a high-low pitch propeller, an engine driven hub having a sleeved extension, blades socketed in the hub for pitch shifting movement and normally seeking a low pitch position, a pitch shifting unit carried by said hub extension and adapted to shift the blades to the high pitch position, said unit comprising relatively movable piston and cylinder members chambered to contain a quantity of centrifugally responsive fluid, both of said members being journalled for rotation relative to the hub and one of the members being fixed against axial movement relative thereto, means transmitting axial movement of the other said member to pitch change of said blades, and remote control means for selectively controlling the rotation of said members whereby the application of centrifugal force upon the fluid of the chamber is always under the control of the pilot.

3. In a high-low pitch propeller, an engine driven hub, blades socketed in the hub and having a journal bearing for pitch shifting movement, said blades normally seeking a low pitch position, an axially symmetrical fluid operated pitch shifting unit carried by the hub and acting in a fore and aft direction in response to centrifugal force while the hub is rotating for shifting the blades to the high pitch position, and a manual controller for exposing the unit to and isolating it from the application of centrifugal force, said unit comprising cooperating piston and cylinder members defining an expansible chamber of minimum capacity and being relatively movable under the action of centrifugal force for enlargement of the chamber, a charge of centrifugally responsive fluid disposed in the minimum chamber, and means responding to the actuation of the manual controller for subjecting the fluid to the centrifugal force of rotation.

4. In a high-low pitch propeller, an engine driven hub, blades socketed in the hub and having a journal bearing for pitch shifting movement, said blades normally seeking a low pitch position, an axially symmetrical fluid operated pitch shifting unit carried by the hub and acting in a fore and aft direction in response to centrifugal force while the hub is rotating for shifting the blades to the high pitch position, and a manual controller for exposing the unit to and in a fore and aft direction in response to centrifuforce, said unit comprising cooperating annular piston and cylinder members arranged concentric of the hub and defining a chamber of definite minimum capacity for housing a measured quantity of heavy fluid medium, means journalling the unit on the hub and securing one of the members against axial movement relative thereto, means keying the piston and cylinder against relative rotary movement but permitting relative axial movement, means engageable with the said keying means for selectively effecting rotation of the unit with the hub on the one hand and rotation of the unit relative to the hub on the other hand; whereby rotation of the unit with the hub will displace the heavy fluid medium from said minimum chamber to effect relative axial movement of the piston and cylinder, and pins responding to the relative movement of the piston members for shifting the blades to the high pitch position.

5. In a high-low pitch propeller, an engine driven hub, blades socketed in the hub and having a journal bearing for pitch shifting movement, said blades normally seeking a low pitch position, an axially symmetrical fluid operated pitch shifting unit carried by the hub and acting in a fore and aft direction in response to centrifugal force while the hub is rotating for shifting the blades to the high pitch position, and a manual controller for exposing the unit to and isolating it from the application of centrifugal force, said unit comprising a pair of telescoping members providing an annular chamber for reception of a quantity of fluid and each having an annular face extending radially therefrom, bearing means journalling the unit on the hub, means permitting relative axial movement of one of the telescoping members, means translating axial movement of the said member to rotary movement of the blades in the hub, means including a pair of cooperating and normally engaging friction faces on the hub and unit for effecting rotation of the unit with the hub whereby fluid in the annular chamber is rotated to press outwardly and between the annular faces of the said members, and means for disengaging the friction faces whereby rotation of the unit is arrested and the fluid returned to the annular chamber.

6. In a high-low pitch propeller, an engine driven hub, blades socketed in the hub and having a journal bearing for pitch shifting movement, said blades normally seeking a low pitch position, an axially symmetrical fluid operated pitch shifting unit carried by the hub and acting in a fore and aft direction in response to centrifugal force while the hub is rotating for shifting the blades to the high pitch position, and a manual controller for exposing the unit to and isolating it from the application of centrifugal force, said unit comprises cooperating annular piston and cylinder members arranged concentric of the hub and defining a chamber of definite minimum capacity for housing a measured quantity of heavy fluid medium, said piston and cylinder having opposed parallel pressure faces radially outward of the chamber and adapted to be separated in response to centrifugal force applied to the contained heavy fluid medium, means rotatably supporting the unit on the hub and permitting axial movement of one of the members, and means for selectively rotating the unit with the hub for high pitch shift of the blades, and for arresting the unit relative to the hub for low pitch shift of the blades.

7. In a high-low pitch propeller, a power driven hub, blades socketed in the hub by journal and inward thrust bearings, for pitch shifting movement, said blades normally seeking a low pitch position in response to centrifugal force and aerodynamic forces applied to the blade during hub rotation, a pitch shifting unit selectively operable to effect shift of the blades to the high pitch position, said unit including an annular expansion chamber arranged concentric with the hub and adapted to be rotated by the hub, a fluid medium disposed in the chamber and operable upon the application of centrifugal force thereto to expand said chamber, and means controlling the rotation of the unit comprising a clutch face on the hub a friction face on the unit yieldingly urged to engage the clutch face, and a brake face selectively engageable with the friction face for disengaging it from the clutch face, and for arresting rotation of the unit.

8. In a high-low pitch propeller, a power driven hub, blades socketed in the hub by journal and inward thrust bearings, for pitch shifting movement, said blades normally tending to seek a low pitch position in response to centrifugal force and aerodynamic forces applied to the blade during hub rotation, a pitch shifting unit for opposing the tendencies of the blades and for shifting the blades to the high pitch position, said unit comprising relatively movable annular piston and cylinder concentric of the hub, bearing means journalling the unit on the hub, and selective control means comprising a clutch face rotatable with the hub, a friction face rotatable with the unit and urged to engage the friction face whereby rotation of the hub rotates the unit, a brake face engageable with and disengageable from the friction face whereby the unit may be arrested against rotation with the hub, and a manually operated member for actuating the brake face, said unit having a chamber charged with a quantity of fluid of high density and operable upon rotation by the hub to exert pressure between the piston and cylinder for effecting blade shift to the high pitch position.

9. A blade shifting unit for aircraft propellers, comprising in combination, a hub, a pair of telescopically related members rotatably mounted on the hub concentric with its axis, said members being relatively axially movable and defining an annular chamber of radially stepped diameter, the larger diameter step of which is entirely collapsible upon relative axial movement of said members, in one direction, a centrifugally responsive liquid mass partially filling the smaller diameter step of the annular chamber, manually actuated means for selectively coupling the said related members and liquid mass for rotation with the hub, and for arresting their rotation, said liquid mass when rotated acting in response to centrifugal force for separating the members by enlargement of the larger diameter stepped portion in an axial direction of the annular chamber.

10. In a high-low pitch propeller, an engine driven hub, blades socketed in the hub and having a journal bearing for pitch shifting movement, said blades normally seeking a low pitch position, an axially symmetrical fluid operated pitch shifting unit carried by the hub and acting in a fore and aft direction in response to centrifugal force while the hub is rotating for shifting the blades to the high pitch position, and a manual controller for exposing the unit to and isolating it from the application of centrifugal force, said unit comprising cooperating piston and cylinder members defining an expansible chamber of minimum capacity, a fluid medium in said chamber means providing a journal bearing for the unit on the hub and for relative movement of one of the members axially of the hub, means keying the piston and cylinder members against relative rotation and providing a friction face, a clutch face rotatable with the hub, means yieldingly urging the friction face into engagement with the clutch face for effecting rotation of the unit with the hub whereby rotation of said unit effects rotation of the fluid medium and axial movement of said cylinder, and a brake face engageable with the friction face for arresting the rotation of the unit.

JOSEPH STUART, III.
WARREN D. BERKLEY.

REFERENCES CITED

The following references are of record in the file of this patent:

UNITED STATES PATENTS

| Number | Name | Date |
|---|---|---|
| 35,589 | Dillon | June 17, 1862 |
| 1,001,613 | Brown | Aug. 29, 1911 |
| 1,844,227 | Patriarche | Feb. 9, 1932 |
| 1,903,628 | Landrum | Apr. 11, 1933 |
| 1,952,800 | Havill | Mar. 27, 1934 |
| 2,032,255 | Caldwell | Feb. 25, 1936 |
| 2,105,843 | Preston et al. | Jan. 18, 1938 |
| 2,160,553 | Martinotti | May 30, 1939 |
| 2,164,489 | Berliner | July 4, 1939 |
| 2,186,791 | Willgoos | Jan. 9, 1940 |
| 2,237,191 | Mills | Apr. 1, 1941 |
| 2,342,442 | Willard | Feb. 22, 1944 |
| 2,347,962 | Oliver | May 2, 1944 |
| 2,427,586 | Biermann | Sept. 16, 1947 |